US008417552B2

(12) United States Patent
Butler et al.

(10) Patent No.: US 8,417,552 B2
(45) Date of Patent: Apr. 9, 2013

(54) ELECTRONIC SELECT PROVIDER NETWORK

(75) Inventors: Rhett A. Butler, Buffalo Grove, IL (US); George A. Coll, Lake Barrington, IL (US); Eric J. Castro, Elgin, IL (US); Carlos E. Fojo, Elgin, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 800 days.

(21) Appl. No.: 12/175,298

(22) Filed: Jul. 17, 2008

(65) Prior Publication Data

US 2010/0017254 A1  Jan. 21, 2010

(51) Int. Cl.
- *G06Q 10/00* (2006.01)
- *G06Q 30/00* (2006.01)
- *G06Q 99/00* (2006.01)

(52) U.S. Cl.
USPC ........ 705/7.14; 705/304; 705/26.81; 705/317

(58) Field of Classification Search .......................... None
See application file for complete search history.

(56) References Cited

U.S. PATENT DOCUMENTS

| 5,960,411 | A  | * | 9/1999  | Hartman et al. | 705/26.81 |
|-----------|-----|---|---------|----------------|-----------|
| 6,085,169 | A  | * | 7/2000  | Walker et al.  | 705/4     |
| 6,356,878 | B1 | * | 3/2002  | Walker et al.  | 705/26.81 |
| 6,581,040 | B1 |   | 6/2003  | Wright et al.  |           |
| 6,865,559 | B2 | * | 3/2005  | Dutta          | 705/75    |
| 7,069,242 | B1 | * | 6/2006  | Sheth et al.   | 705/37    |
| 7,096,193 | B1 | * | 8/2006  | Beaudoin et al.| 705/26.1  |
| 7,194,429 | B2 | * | 3/2007  | Takae et al.   | 705/26.1  |
| 7,225,220 | B2 | * | 5/2007  | Gonzalez et al.| 709/202   |
| 7,272,575 | B2 | * | 9/2007  | Vega           | 705/80    |
| 7,464,163 | B1 | * | 12/2008 | Bantz et al.   | 709/226   |
| 7,664,667 | B1 | * | 2/2010  | Ruppelt et al. | 705/7.13  |
| 8,200,231 | B2 | * | 6/2012  | Gonen et al.   | 455/445   |
| 2002/0019786 | A1 | * | 2/2002 | Gonzalez et al.| 705/28 |
| 2003/0093338 | A1 | * | 5/2003 | Kim et al.     | 705/27 |
| 2004/0220848 | A1 | * | 11/2004 | Leventhal     | 705/9  |
| 2004/0260631 | A1 | * | 12/2004 | Leventhal     | 705/30 |
| 2006/0085302 | A1 | * | 4/2006  | Weiss et al.  | 705/30 |
| 2006/0184381 | A1 | * | 8/2006  | Rice et al.   | 705/1  |
| 2006/0247999 | A1 | * | 11/2006 | Gonen et al.  | 705/37 |
| 2007/0276710 | A1 | * | 11/2007 | Hudgeon et al.| 705/7  |

* cited by examiner

*Primary Examiner* — Mussa A Shaawat

(74) *Attorney, Agent, or Firm* — McAndrews, Held & Malloy, Ltd.

(57) ABSTRACT

Described herein is technology for, among other things, an electronic services marketplace. The technology involves establishing a first tier of service providers, establishing a second tier of service providers, routing a service order to the first tier of service providers, and routing the service order to the second tier of service providers if the service order is not accepted by one of the first tier service providers.

16 Claims, 19 Drawing Sheets

Network Name

Network Contact Name | Network Contact Email

Criteria

| | Field | Criteria Value |
|---|---|---|
| Remove | Resource Credentials | Contractor/Low Voltage Systems |
| Remove | Skills | Home Electronics/General Home Theater/Install |
| Remove | Insurance | General Liability >=500,000.00 |

Add Criteria

Network Description

Network Approval Instructions

Documents & Attachments

Select from list of files in your Document Manager ▼   [ Add Attachment ]

| | Name | Description |
|---|---|---|
| Remove | Home Theater SPN T&Cs | Home Theater Installer Terms and Conditions for SPN |
| Remove | Home Theater SPN Sign | Home Theater Installer Signature of Agreement for SPN |

☐ This network requires provider to attach documents

[ Create/Update ]   [ Delete ]                                Cancel

FIG. 17

| | Network Name | Service Pro Matches | Members | Inactive | Applicants |
|---|---|---|---|---|---|
| Edit Manage Members | Plumbing Tier 1 | 1,245 | 549 | 14 | 113 |
| Edit Manage Members | Plumbing Tier 2 | 1,008 | 310 | 2 | 80 |
| Edit Manage Members | Home Theater Tier 1 | 2,544 | 1,023 | 35 | 134 |

Create New Network

FIG. 18

ELECTRONIC SELECT PROVIDER NETWORK

REFERENCE TO CO-PENDING APPLICATIONS FOR PATENT

The present application for patent is related to the following co-pending U.S. Patent Applications:

"Establishing a Buyer/Service Provider Relationship Electronically" by Butler et al, having 12/175,250, filed concurrently herewith, assigned to the assignee hereof, and expressly incorporated by reference herein; and "Profiling Service Provider Companies and Technicians" by Butler et al, having 12/175,210, filed concurrently herewith, assigned to the assignee hereof, and expressly incorporated by reference herein.

BACKGROUND

Recently, online service marketplaces have become increasingly common. Typically, these web sites serve as a bulletin board system to facilitate the initial contact between service buyers and service providers. In most cases, the online marketplace's involvement ends here. In other words, most online service marketplaces play no role in the negotiations for the services, in monitoring the progress of the provision of the services, or in following up with buyers as to the level of satisfaction with the services.

In conventional online service marketplaces, the service provider user accounts are typically "single user" accounts. That is, a service provider company creates an account for itself, but the account does not take into consideration the company's individual technicians, their availability, and their particular skills. While these single user accounts may be perfectly adequate for a sole proprietor, such is not the case with respect to service provider companies having multiple technicians.

This is particularly important from a consumer protection standpoint. For example, Technician X for Company A may do a higher volume of quality work, which is reflected favorably in Company A's buyer feedback. However, Technician Y, a new employee of Company A, may perform sub-standard work. Thus, a buyer who selects Company A as its service provider based on its positive feedback nonetheless runs the risk of Company A assigning the task to a lesser technician (e.g., Technician Y). In other words, a buyer does not have the opportunity to evaluate the individual technicians working for Company A and say, "I want Technician X, not Technician Y."

Single user accounts are also disadvantageous from a service provider's perspective. In particular, while a service provider company may use the online marketplace as a means for gathering sales leads, the actual delegation to and dispatch of its technicians must be handled internally.

Conventional online service marketplaces also do not offer a sufficiently robust platform to serve the needs of "enterprise" buyers, such as department stores that sell a variety of appliances and home furnishings that may require installation or other services related to the goods. Typically, online service marketplaces focus on a particular service vertical, such as IT. With these types of marketplaces, enterprise buyers are forced to jump around from marketplace to marketplace depending on the type of service needed at any given time. In cases where online service marketplaces do encompass multiple service verticals, such marketplaces are designed with only the simple (e.g., homeowner) buyer in mind. Thus, these marketplaces do not contemplate continuing business relationships between buyers and service providers.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a method for establishing a relationship between a buyer and a service provider. The method includes hosting a database of profiles of a plurality of service providers across a plurality of service verticals, receiving information from the buyer corresponding to a service to be performed for the buyer, and building a service order based on the information received from the buyer. The method also includes determining, based upon the information received from the buyer, one or more qualified service providers from the database, providing the service order to the qualified service providers, providing the qualified service providers with the options of accepting the service order, rejecting the service order, and making a counter-offer, and receiving a selection from at least one of the qualified service providers of one of the options. A buyer-service provider relationship is established between the buyer and a particular qualified service provider upon the particular qualified service provider's acceptance of the service order or upon the buyer's acceptance of a counter-offer from the particular qualified service provider.

Another embodiment of the present invention is directed to a method of delegating a service order to a plurality of service providers registered on a service provider network. The method includes establishing a first tier of the service providers, establishing a second tier of the service providers, routing the service order to the first tier of service providers, and routing the service order to the second tier of service providers if the service order is not accepted by one of the first tier service providers.

Another embodiment of the present invention is directed to a method for managing a service provider network including a number of service provider companies, where each of the service provider companies has a number of technicians associated therewith. The method includes creating user accounts associated with the service provider companies, where the user accounts include service provider company profiles. The method also includes receiving from the service provider companies respective contact information, respective service information describing one or more categories of services the respective service provider companies offer, and respective financial account information and populating the service provider company profiles with the contact information, the service information, and the financial account information. The method further includes receiving technician information specific to each of the technicians, which information includes specific services that the technicians are able to perform, creating technician profiles corresponding to the technicians, populating the technician profiles with the technician information, and associating the service provider company profiles with the corresponding technician profiles. The method further includes receiving a request for services from a buyer, determining whether any of the technicians are able to perform the requested services, assigning the request for service to a particular technician that is able to perform the requested services, and routing payment for the requested service to a financial account associated with the service provider company associated with the particular technician.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 17 illustrates a user interface for creating and/or updating a tier of service providers, in accordance with an embodiment of the present invention;

FIG. 18 illustrates a user interface for viewing the allocation of the service providers between a first-tier and a second-tier, in accordance with an embodiment of the present invention.

DETAILED DESCRIPTION

Figure 1:
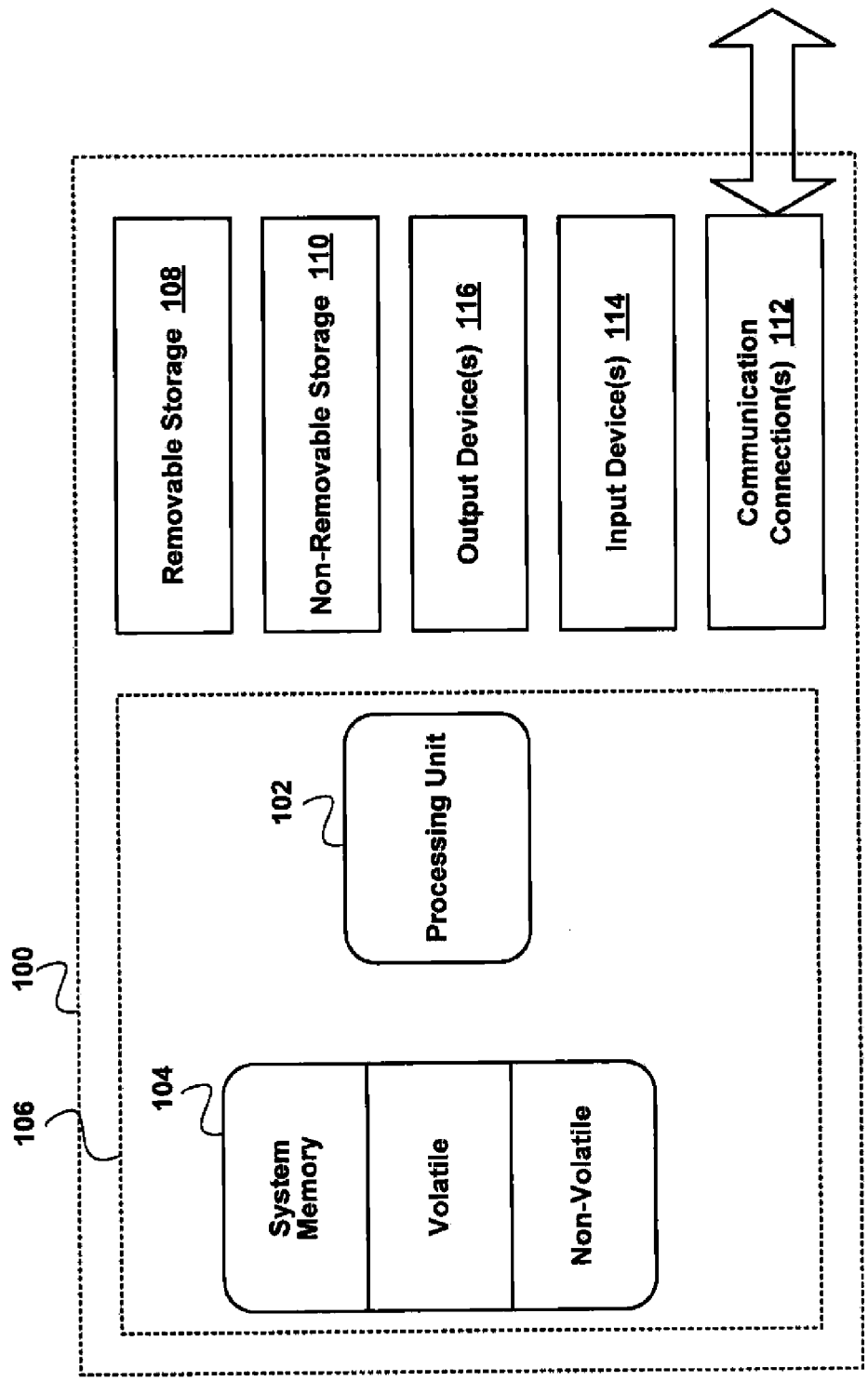
FIG. 1 illustrates an exemplary operating environment for implementing embodiments.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

With reference to FIG. 1, an exemplary system for implementing embodiments includes a general purpose computing system environment, such as computing system environment 100. In its most basic configuration, computing system environment 100 typically includes at least one processing unit 102 and memory 104. Depending on the exact configuration and type of computing system environment, memory 104 may be volatile (such as RAM), non-volatile (such as ROM, flash memory, etc.) or some combination of the two. This most basic configuration is illustrated in FIG. 1 by dashed line 106. Additionally, computing system environment 100 may also have additional features/functionality. For example, computing system environment 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 100. Any such computer storage media may be part of computing system environment 100.

Computing system environment 100 may also contain communications connection(s) 112 that allow it to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing system environment 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Figure 2:
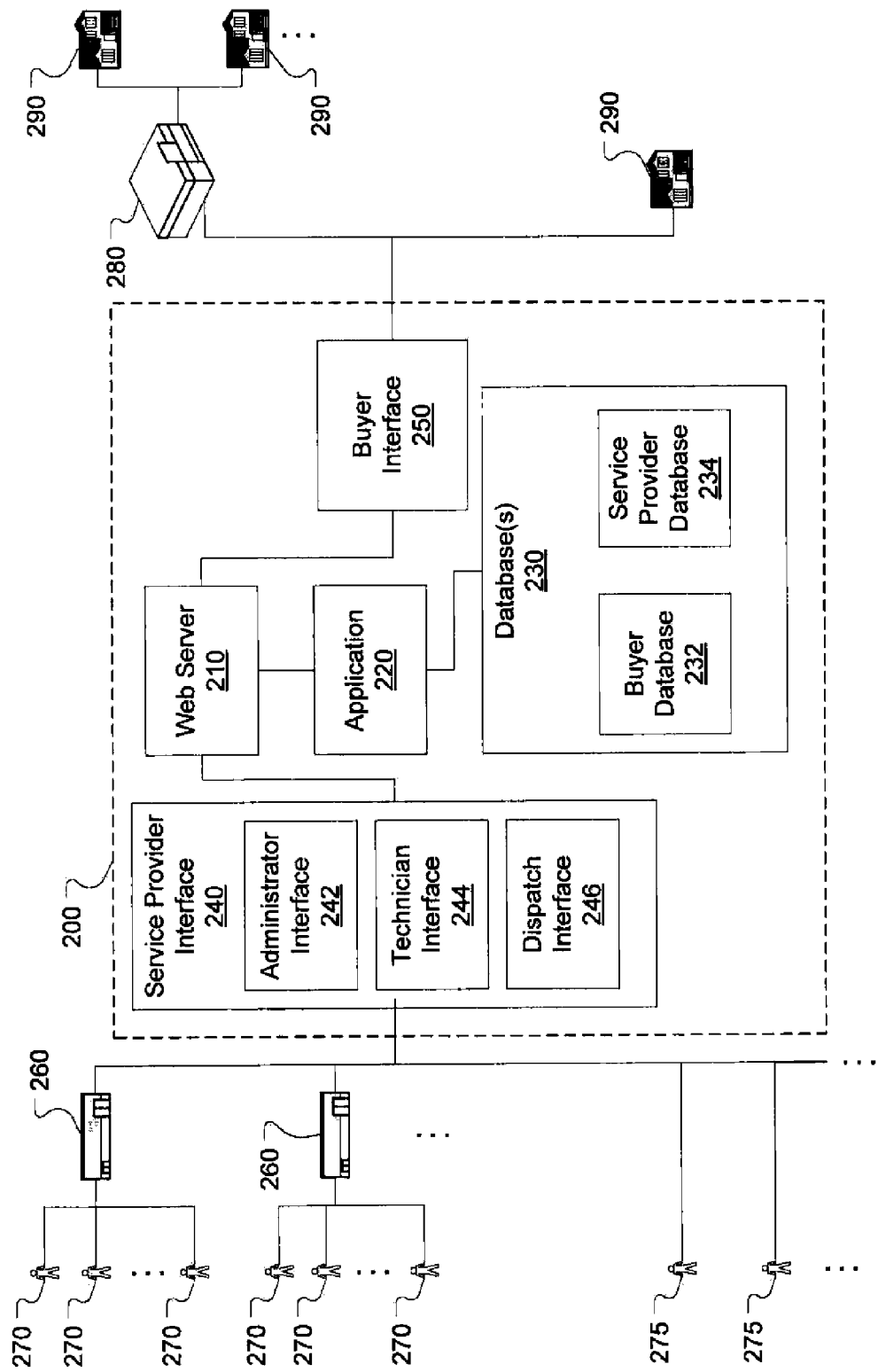
FIG. 2 illustrates a services marketplace system, in accordance with various embodiments of the present invention.

FIG. 2 illustrates a services marketplace system 200, in accordance with various embodiments of the present invention. System 200 is well-suited for operation on the Internet. However, system 200 may also be implemented on various other communication networks and/or mediums.

Generally speaking, system 200 is operable to facilitate the routing of service requests from various different types of buyers to various different types of service providers. The buyer/service requester may be a consumer 290. The buyer/service requester may also be an enterprise buyer 280, such as a home-improvement store or other department store, which orders services on behalf of one or more consumers 290. Based on the type and scope of the requested services, a service order is routed to an appropriate service provider. The service provider may be a service provider company 260 having a team of multiple technicians 270, or the service provider may be a sole proprietor 275. The requests for services can involve a wide range of primary service verticals, including but not limited to home electronics, HVAC, and garage and shed. If therefore follows that the service requests can also involve a wide range of service, including but not limited to installation of household applications, such as a garage door opener, a water beater, a furnace, an air conditioner, a dishwasher, a garbage disposal, a water softener, and the like; television installation; home theater installation; computer set-up; home computer network set-up; installation of a shed or fence; and installation of cabinetry.

System 200 includes a web server 210, which is operable to manage communications between various service providers 260, 270, 275 and various service buyers 280, 290. The web server 210 may communicate with the various service providers 260, 270, 275 via a service provider interface 240, and it may communicate with the various service buyers 280, 290 via a buyer interface 250. The service provider interface 240 may include a separate administrator interface 242, technician interface 244.

Web server 210 is in communication with an application 220 that is operable to process the communications between the service providers 260, 270, 275 and the buyers 280, 290. The application 220 may operate on the same physical machine as the web server 210, or it may operate on a separate machine. Moreover, the processing of application 220 may also be distributed across several machines. The operations of application 220 are discussed at greater length below.

The application 220 is communicatively coupled with one or more databases 230. The databases 230 store profiles for each of the buyers 280, 290 and service providers 260, 270, 275. Accordingly, databases 230 may include a separate buyer database 232 and service provider database 234, which may or may not be physically separate from each other.

Figure 3:
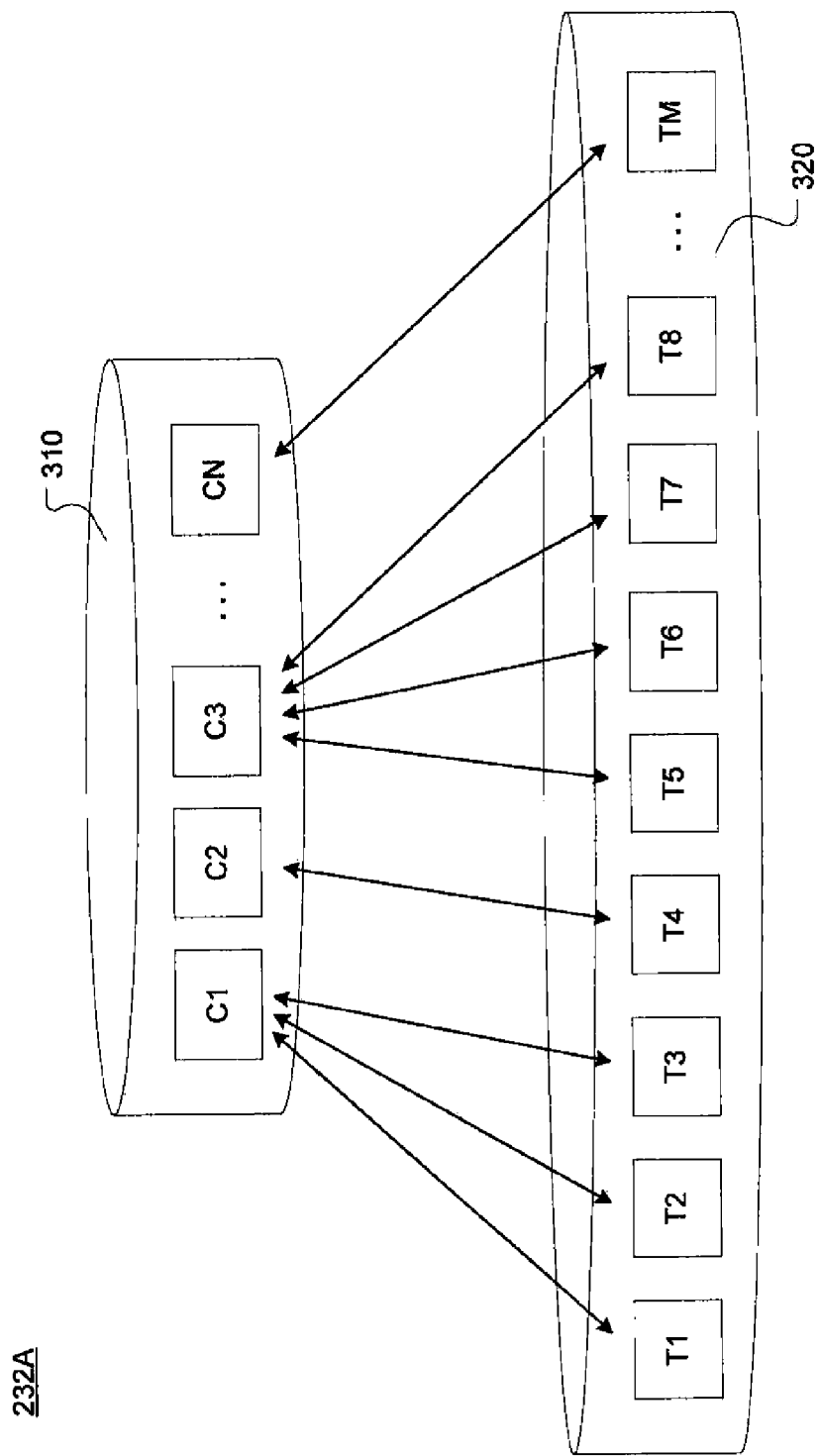
FIG. 3 illustrates an architecture for a buyer database, in accordance with an embodiment of the present invention.
Figure 4A:
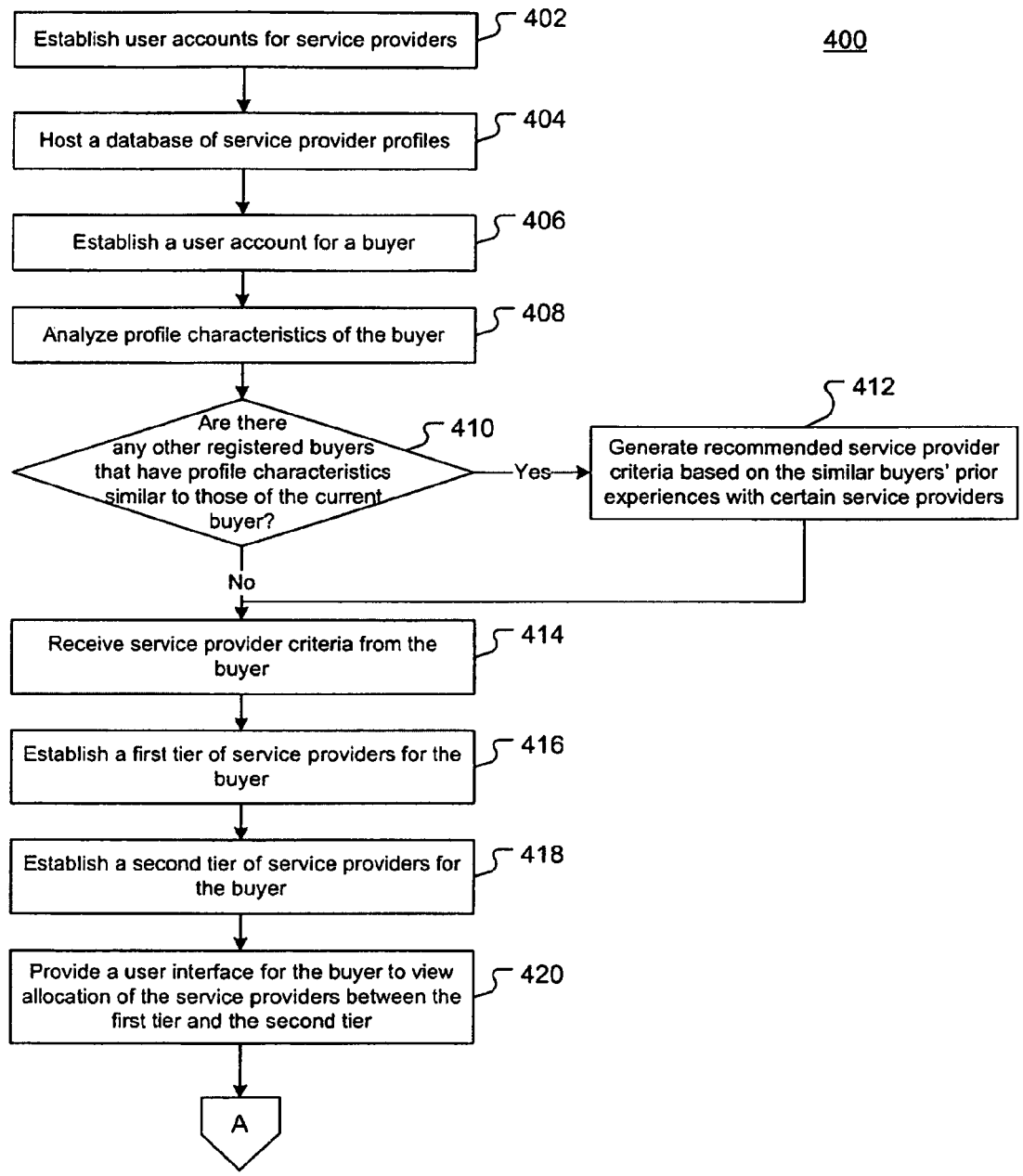
FIGS. 4A-E illustrate a flowchart for a process of managing service orders, in accordance with various embodiments of the present invention.
Figure 4B:
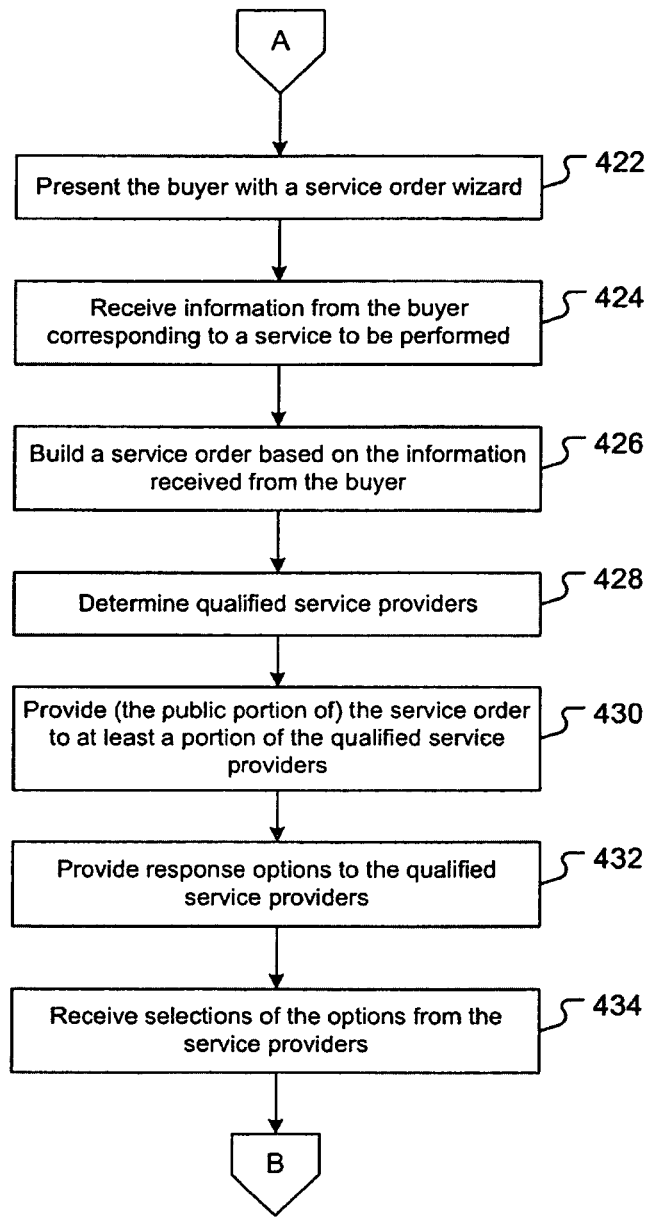
Figure 4C:
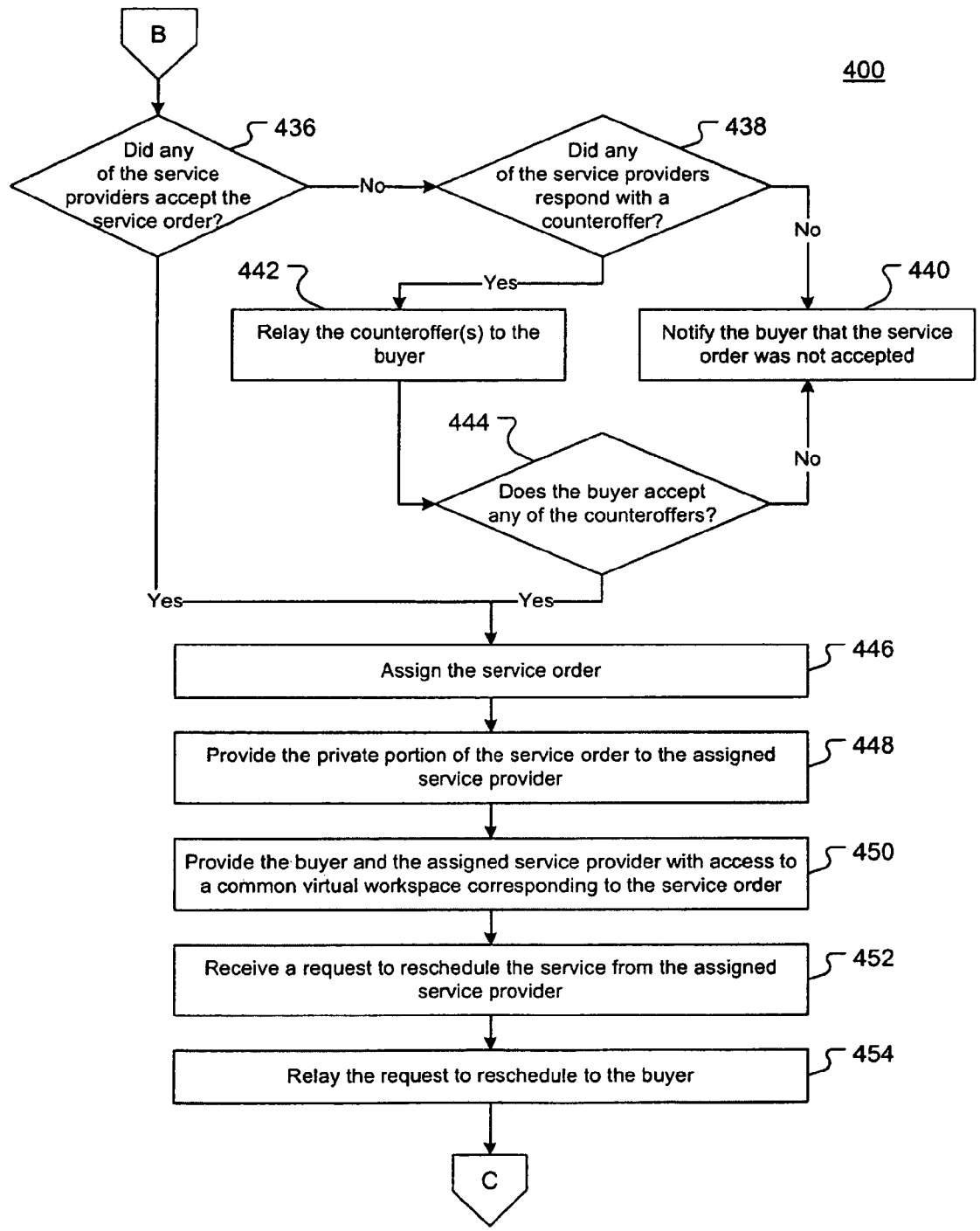
Figure 4D:
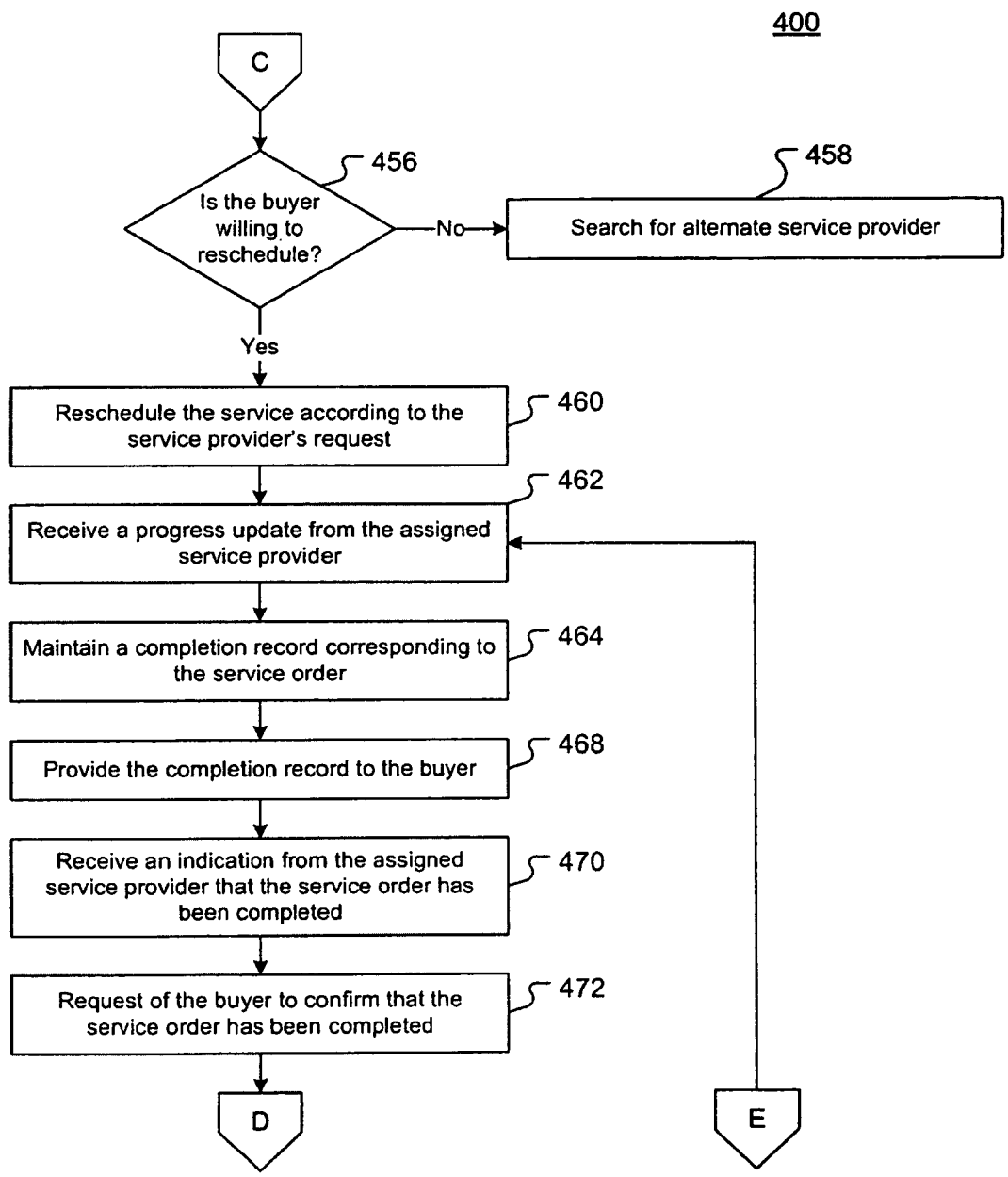
Figure 4E:
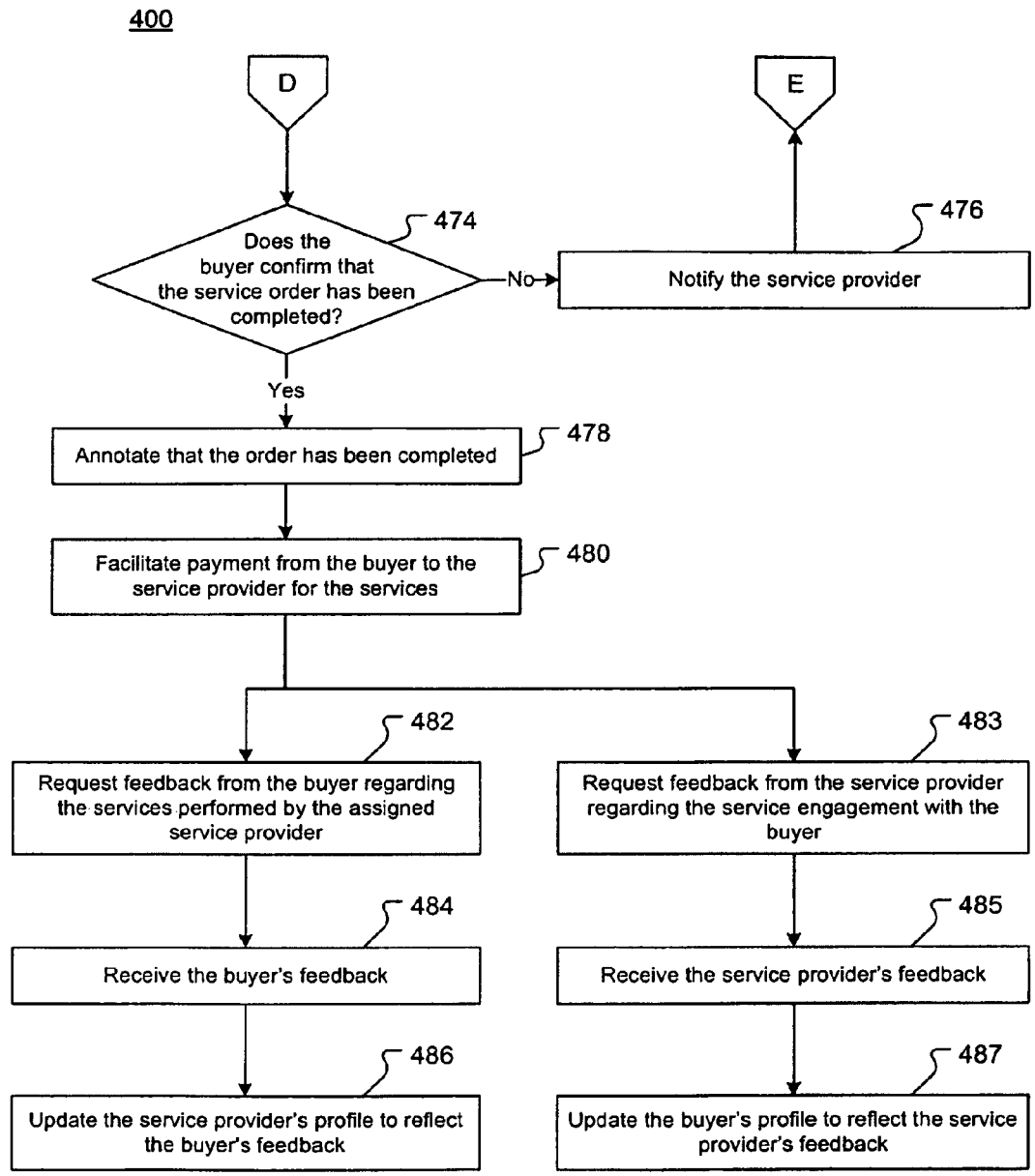

FIG. 3 illustrates one architecture for a buyer database 232A, in accordance with an embodiment of the present invention. Buyer database 232A may include a company database 310 for storing company profiles C1-CN and a technician database 320 for storing technician profiles T1-TM. Each of the company profiles C1-CN corresponds to a different service provider company 260, and each of the technician profiles T1-TM corresponds to a different technician 270. Each of the technician profiles T1-TM is linked to the corresponding company profile C1-CN, and vise versa. Company profile C2 and technician profile T4 illustrate the case of a sole proprietorship 275.

A given company profile C1-CN may include various types of information, including but not limited to primary service verticals in which the company provides service, a dispatch address, a coverage area, languages spoken by the company's technicians, warranties offered by the company, certifications held by the company, licenses held by the company, insurance status of the company, and material inventory of the company. Correspondingly, the technician profiles T1-TM may also include various types of information, including but not limited to primary service verticals associated with the technician, the technician's dispatch address, the technician's coverage area, languages spoken by the technician, certifications held by the technician, licenses held by the technician, background check results corresponding to the technician, drug test results of the technician, the technician's particular skills, the technician's availability, and records of the technicians past performance in responding to previous service orders, which may include feedback from at least one previous buyer for whom the technician has responded to a least one previous service order.

The following discussion sets forth in detail the operation of present technology for a services marketplace system. With reference to FIGS. 4-14, flowcharts 400, 402A, 416A, 416B, 422A, 430A, 432A, 446A, 1200, 464A, and 1400 each illustrate example steps used by various embodiments of the present technology for a services marketplace system 200. Flowcharts 400, 402A, 416A, 416B, 422A, 430A, 432A, 446A, 1200, 464A, and 1400 include processes that, in various embodiments, are carried out by a processor under the control of computer-readable and computer-executable instructions. The computer-readable and computer-executable instructions may reside, for example, in data storage features such as storage devices 108, 110 of FIG. 1. Although specific operations are disclosed in flowcharts 400, 402A, 416A, 416B, 422A, 430A, 432A, 446A, 1200, 464A, and 1400, such operations are examples. That is, embodiments are well suited to performing various other operations or variations of the operations recited in flowcharts 400, 402A, 416A, 416B, 422A, 430A, 432A, 446A, 1200, 464A, and 1400. It is appreciated that the operations in flowcharts 400, 402A, 416A, 416B, 422A, 430A, 432A, 446A, 1200, 464A, and 1400 may be performed in an order different than presented, and that not all of the operations in flowcharts 400, 402A, 416A, 416B, 422A, 430A, 432A, 446A, 1200, 464A, and 1400 may be performed. Where helpful for the purposes of illustration and not for limitation, FIGS. 4-14 will be described with reference to FIGS. 2 and 3, which illustrate hypothetical situations in which embodiments may be implemented.

Figure 5:
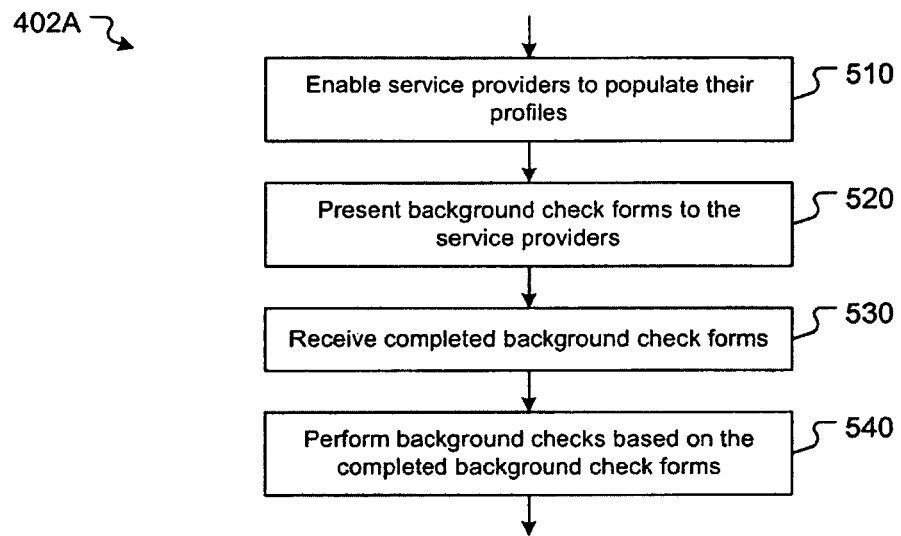
FIG. 5 illustrates a flowchart for a process of establishing a service provider user account, in accordance with an embodiment of the present invention.

FIGS. 4A-E illustrate a flowchart 400 for a process of managing service orders, in accordance with various embodiments of the present invention. In one embodiment, process 400 begins at block 402, where user accounts are established for the service providers. It should be appreciated that this may be achieved in a number of ways. For example, FIG. 5 illustrates a flowchart 402A for a process of establishing a service provider user account, in accordance with an embodiment of the present invention. At block 510, the system enables the service providers to populate their profiles. This may involve, for example, providing the service provider with one or more forms requesting various information about the service provider. At block 520, background check forms may also be provided to the service providers. In the case of a service provider company, the background check forms may require information specific to the company itself, as well as information specific to each of the company's technicians. Once the completed background check forms are completed (block 530), background checks are performed based thereon (block 540). Provided a service provider passes the background check, the service provider's user account is finalized and the service provider is granted access to the system. If the service provider fails the background check, there are a number of possible responses. For example, the service provider's request for a user account may be rejected outright. Alternatively, the system may send a notification to the service provider informing it of the deficiencies in the background check and providing the service provider with an opportunity to cure the deficiencies.

With reference again to FIG. 4, once user accounts have been established for the service providers, a database of service provider profiles is hosted (block 404), such as database 234. At block 406, user accounts are established for a buyer. Once the buyer has created a user account, the buyer may then begin submitting service orders with the system.

In one embodiment, the system may generate recommendations to the buyer for a service order that the buyer intends to submit. For example, at block 408, the system may analyze the buyer's profile characteristics. Then, a determination may be made as to whether there are any other registered buyers that have profile characteristics similar to those of the current buyer (block 410). If similar buyers are found, the system generates recommended service provider criteria for the buyer based on the similar buyers prior experiences with certain service providers. For instance, the system may inform the buyer that similarly situated buyers reported positive results from service providers having a particular certification or a particular skill set. Ultimately, service provider criteria is received from the buyer (block 414).

In one embodiment, the system may provide enhanced functionality to buyers who repeatedly order similar services, such as enterprise buyers, to establish multiple tiers of service providers, whereby a first-tier is a "select provider network" and other tiers are secondary to the first tier. A buyer may optionally have several sets of select provider networks. For example, a buyer may one set for home electronics and another for HVAC. A buyer may also have different sets of select provider networks based upon geographic location, such as having a different set for each metropolitan area in which the buyer requires services. While reference may be repeatedly made herein to an arrangement involving two tiers, it should be appreciated that any number of tiers may be used. It should be appreciated that corresponding first and second tiers may be mutually exclusive in terms of their service provider membership.

Figure 6:
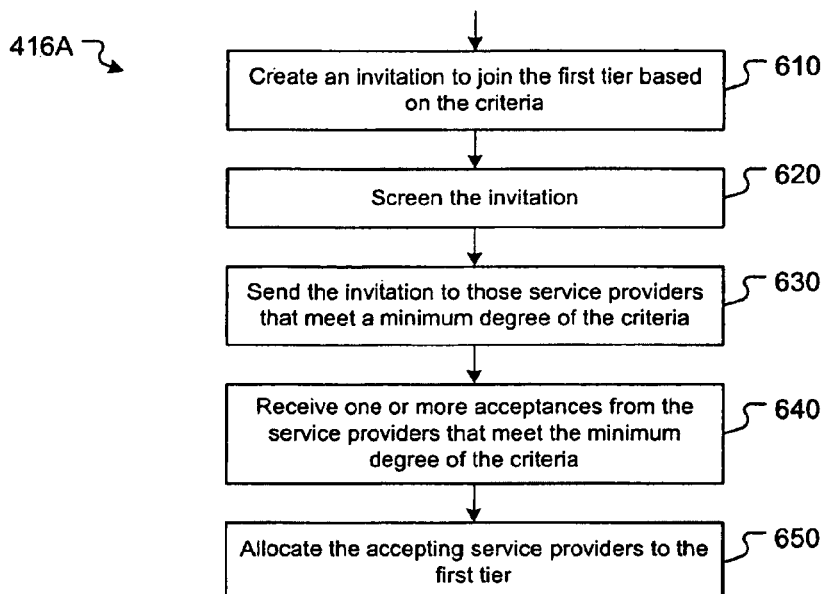
FIG. 6 illustrates a flowchart of a process for establishing a first tier of service providers, in accordance with an embodiment of the present invention.

At block 416, the first tier of service providers is established for the buyer. It should be appreciated that this may be achieved in a number of ways. For example, FIG. 6 illustrates a flowchart 416A of a process for establishing a first tier of service providers, in accordance with an embodiment of the present invention. At block 610, an invitation to join the first tier based on the buyer's criteria is created. This may involve, for example, presenting the buyer with a template, such as the one depicted in FIG. 17. In one embodiment, the buyer may attach a document to the invitation, such as, but not limited to, a contract which the service providers are required to sign before they are included in the first tier. At block 620, the system may screen the invitation. This screening step may be performed, for example, to prevent a particular buyer from "spamming" the service providers. At block 630, the invitation is sent to those service providers that meet a minimum degree of the criteria. Once the service providers receive the invitation, they have the option of accepting or rejecting it. At block 640, 1 or more acceptances are received from the service providers. The accepting service providers are then allocated to the first-tier.

Figure 7:
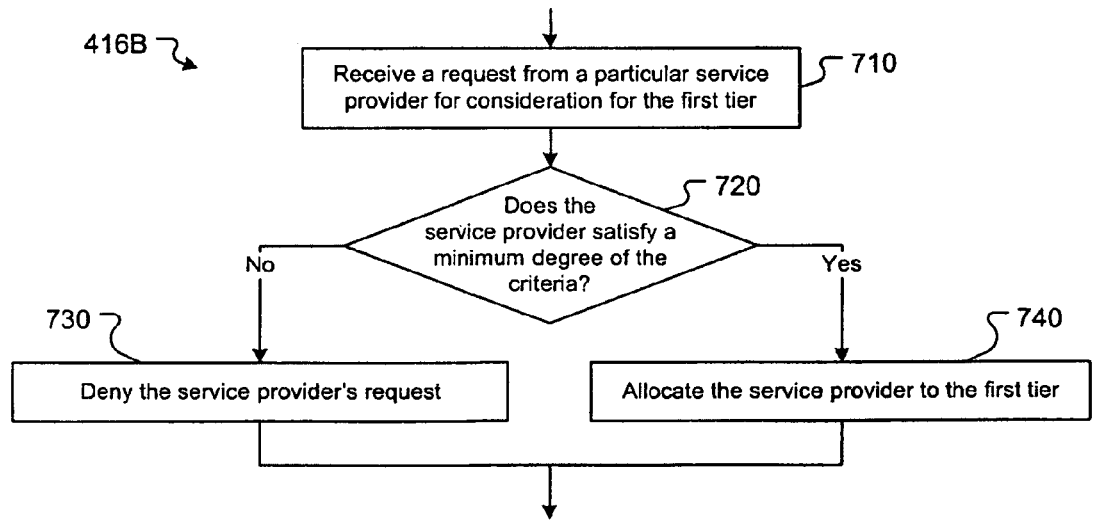
FIG. 7 illustrates a flowchart of another process for establishing a first tier of service providers, in accordance with an embodiment of the present invention.

FIG. 7 illustrates another flowchart 416B of a process for establishing a first-tier of service providers, in accordance with an embodiment of the present invention. At block 710, a request is received from a particular service provider for consideration for the first tier. In other words, rather than the buyer soliciting invitees for the first tier, such as in flowchart 416A, a given service provider may also request to be included in the buyer's first-tier. At block 720, a determination is made as to whether the requesting service provider meets a minimum degree of the buyers criteria. If yes, the service provider is allocated to the first-tier (block 740). If not, the service provider's request is denied (block 730). It should be appreciated that the operations of flowchart 416A and flowchart 416B may be performed together or separately.

With reference again to FIG. 4, at block 418, a second tier of service providers is established for the buyer. In one embodiment, this may include allocating to the second tier those service providers that met the minimum degree of criteria but did not accept the invitation referenced in flowchart 416A. At block 420, the system provides a user interface for the buyer to view the allocation of the service providers between the first tier and the second tier. This may include, for example, providing the user interface of FIG. 18. As shown in the illustrated example of FIG. 18, the buyer has two tiers for plumbing services and one tier for home theater services. If the buyer chooses to edit the properties of Home Theater Tier 1, the buyer may be presented with a user interface such as the one depicted in FIG. 17. As shown in FIG. 17, the buyer may add or remove criteria, provide approval instructions, and attach documents, which may be transmitted with any subsequent invitations.

Figure 8:
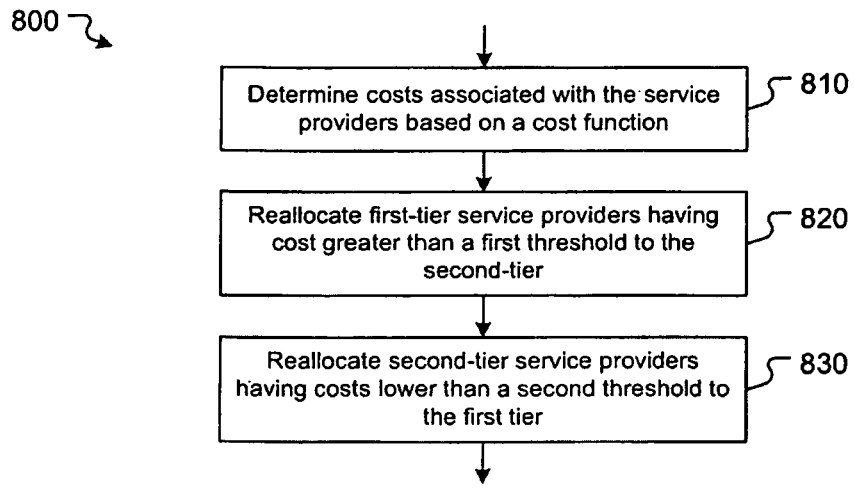
FIG. 8 illustrates a flowchart of a process for reallocating service providers between multiple tiers, in accordance with various embodiments of the present invention.
Figure 9:
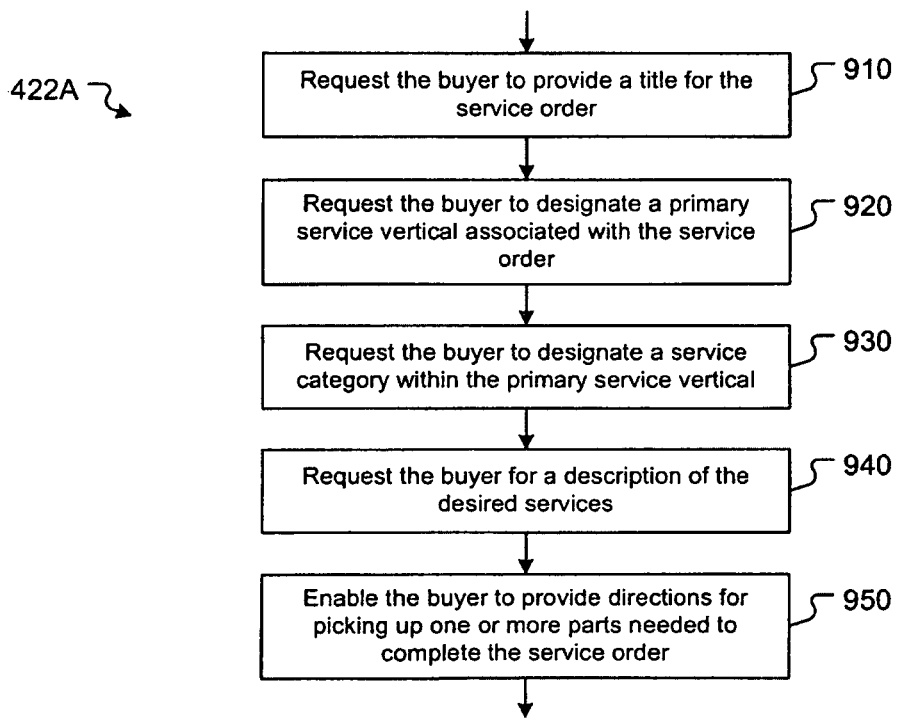
FIG. 9 illustrates a flowchart of a process for presenting a service order wizard, in accordance with various embodiments of the present invention.
Figure 10:
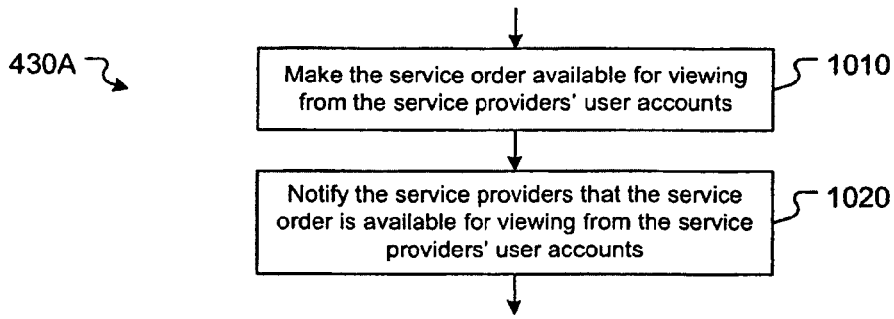
FIG. 10 illustrates a flowchart of a process for providing a service order to a plurality of service providers, in accordance with various embodiments of the present invention.

Periodically, it may be desirable to "refresh" a buyer's Preferred Provider Network by reallocating the service providers that are in the various tiers. It should be appreciated that this may be achieved in a number of ways. For example, FIG. 8 illustrates a flowchart 800 of reallocating service providers between multiple tiers, in accordance with various embodiments of the present invention. At block 810, the system determines costs associated with the service providers based on a cost function. The cost function may incorporate a number of factors, including but not limited to feedback scores from previous service orders, the service provider's frequency with which it requests to reschedule a service order, the frequency with which the service provider releases previously accepted work orders, etc. Once the costs for the service providers have been determined, first-tier service providers having a cost greater then a first threshold are reallocated to the second-tier (block 820), and second-tier service providers having costs lower than a second threshold are reallocated to the first tier (block 830).

Figure 19:
FIG. 19 illustrates a user interface of a service order creation wizard, in accordance with an embodiment of the present invention.

With reference again to FIG. 4, block 422 involves presenting the buyer with a service order wizard. It should be appreciated that this may be achieved a number of ways. In one embodiment, this may be achieved by providing the user interface shown in FIG. 19. In one environment this may also be achieved by the process illustrated by flowchart 422A of FIG. 9. As shown, flowchart 422A involves requesting the buyer to provide a title for the service order (block 910); requesting the buyer to designate a primary server is vertical associated with the service order (block 920); requesting the buyer to designate a service category within the primary service vertical (block 930); and requesting the buyer for a description of the desired services. The description of the desired services may involve the buyer listing a plurality of discrete tasks to be performed by the service provider. The service order wizard may also ask the buyer to provide directions for picking up one or more parts needed to complete the service order (block 950), accounting for situations where the buyer is unable to transport certain parts and/or merchandise. The wizard may also enable the buyer to attach one or more documents to the service order, such as a photograph, a drawing, a text file, a spreadsheet, an on-site checklist, or the like.

With reference again to FIG. 4, once information corresponding to a service to be performed is received from the buyer (block 424), the system builds a service order based on the information received from the buyer (block 426). In one embodiment, the service order includes a public portion and a private portion. The public portion may include information sufficient for the service providers to decide whether to accept the service order, which may include but is not limited to a description of the requested services, a city in which the services are to be performed, a ZIP code in which the services are to be performed, a timeframe in which the services are to be performed, or the like. The private portion of the service order may include information that would enable a service provider to contact the buyer or other similarly sensitive information, such as an address where the services are to be performed, a phone number for the buyer, and e-mail address of the buyer, the buyer's, name, the buyer's phone number, information enabling the service provider to pick up merchandise for the buyer, etc.

At block 428, the system determines which of the service providers are qualified to perform the services. This may involve, for example, matching service providers based on the criteria indicated by the buyer in the service order. At block 430, the service order is provided to at least a portion of the qualified service providers. In one embodiment, the service order may be simply provided to all the qualified service providers. In another embodiment, the buyer may be presented with a list of the qualified service providers, from which the buyer may select those service providers to whom the service order will be sent. This list may be presented, for example, in order of service providers best matching the requirements of the buyer indicated in the service order.

In one embodiment, providing the service order to the service providers may involve directly sending the service order to the service providers, such as by e-mail. In another embodiment, the service order is made available for viewing from the service providers' user accounts (block 1010), and the service providers are notified that the service order is available for viewing (block 1020), as illustrated in flowchart 430A of FIG. 10. In one embodiment, only the public portion of the service order is provided to the service providers.

Figure 11:
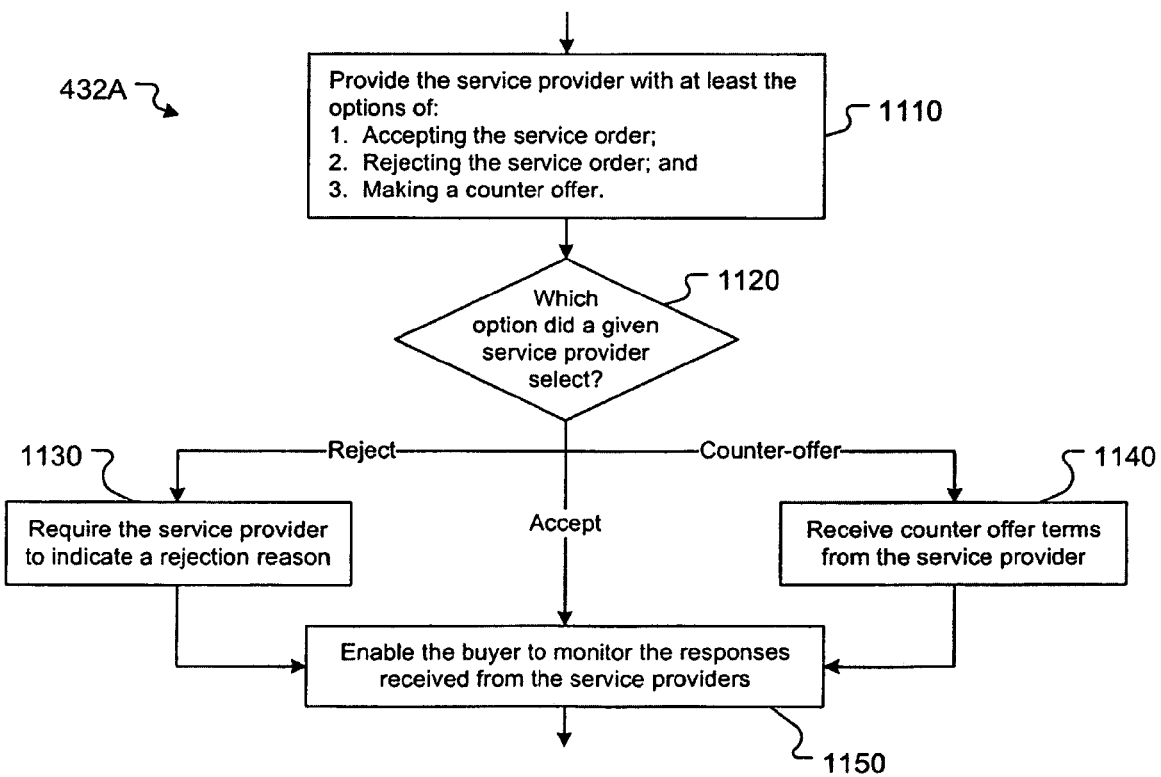
FIG. 11 illustrates a flowchart of a process for providing response options to service providers, in accordance with various embodiments of the present invention.

At block 432, response options are provided to the qualified service providers. The system subsequently receives the service providers' selections of the options (block 434). It should be appreciated that the operations of block's 432 and 434 may be achieved a number of ways. For example, FIG. 11 illustrates a flowchart 432A of a process for providing response options to service providers, in accordance with various embodiments of the present invention. At block 1110, the service provider is provided with at least the options of accepting the service order, rejecting the service order, and making a counteroffer. It should be appreciated that other options may be provided to the service provider as well. At block 1120, a determination is made as to which option a given service provider selected. If a service provider rejected the service order, the service provider may be required to indicate a rejection reason (block 1130). The rejection reasons may include but are not limited to the following: the service location is too far away; a list price for the services is too low; and more information is needed from the buyer. If the service provider makes a counteroffer, the terms of the counteroffer are received from the service provider (block 1140). At block 1150, the system then enables the buyer to monitor the responses received from the service providers.

With reference again to FIG. 4, at block 436, a determination is made as to whether any of the service providers accepted the service order. If yes, the system assigns the service order (block 446). If not, a determination is made as to whether any of the service providers responded with a counteroffer (block 438). If no service providers responded with a counteroffer, the buyer is notified that the service order was not accepted (block 440). If a service provider did respond with a counteroffer, the counteroffer is relayed to the buyer (block 442). If the buyer accepts the counteroffer, the service order is assigned (block 446).

It should be appreciated that the determination of which service provider is assigned the service order may be achieved a number of ways. For example, in one embodiment, if the service order is accepted, the service order may be assigned to the first service provider that responds with an acceptance. Alternatively, the buyer may be provided with a list of accepting service providers, and the buyer may be provided with an opportunity to choose from among the accepting service providers.

Figure 12:
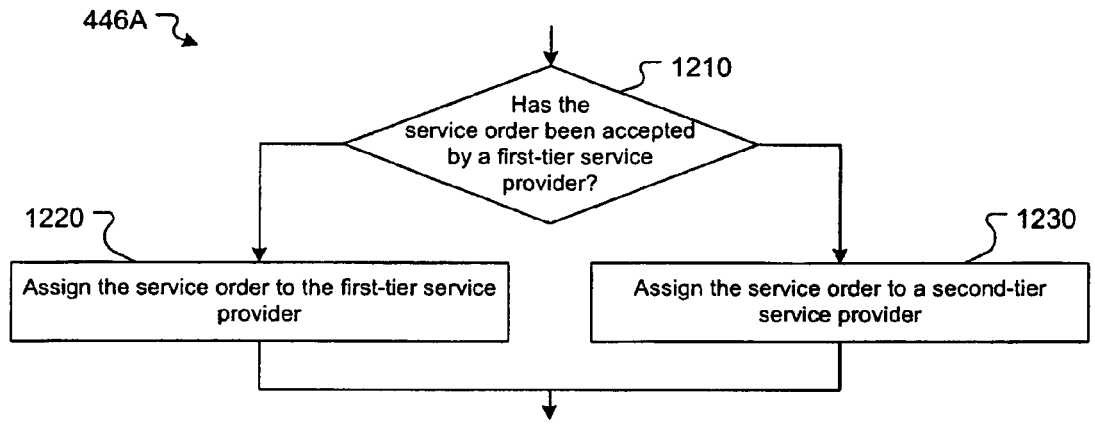
FIG. 12 illustrates a flowchart of a process for assigning a service order when the buyer uses a multi-tier provider network, in accordance with an embodiment of the present invention.

FIG. 12 illustrates a flowchart 446A of a process for assigning a service order when the buyer uses a multi-tier provider network, in accordance with an embodiment of the present invention. At block 1210, a determination is made as to whether the service order has been accepted by one or more first-tier service providers. If it has, the service order is assigned to one of the first-tier service providers (block 1220). As before, the service order may be assigned to the first-tier service provider that accepted service order first, or the service order may be assigned based on a manual selection made by the buyer. If the service order was not accepted by a first-tier service provider, the service order is assigned to a second-tier service provider that accepted the service order (block 1230).

Referring again to FIG. 4, once the service order is assigned, the private portion of the service order may then be provided to the assigned service provider (block 448). At this point, the buyer-service provider relationship has been established. Accordingly the system may then provide the buyer and the assigned service provider with access to a common virtual workspace corresponding to the service order (block 450). This virtual workspace may serve as a means of communication between the buyer and the service provider, in addition to traditional forms of communication.

Occasionally, it may be necessary, for one reason or another, for a service provider to request that the service be rescheduled (block 452). In such a case, the request to reschedule is relayed to the buyer (block 454). If the buyer is not willing to reschedule (block 456), the system searches for an alternate service provider (block 458). In one embodiment, this may involve reassigning the service order to a service provider that had previously accepted the service order but was not assigned to the service order. In another embodiment, this may involve performing the entire search process again, starting with, for example, block 428. If the buyer is willing to reschedule, the system reschedules the service according to the service provider's request (block 460).

Figure 13:
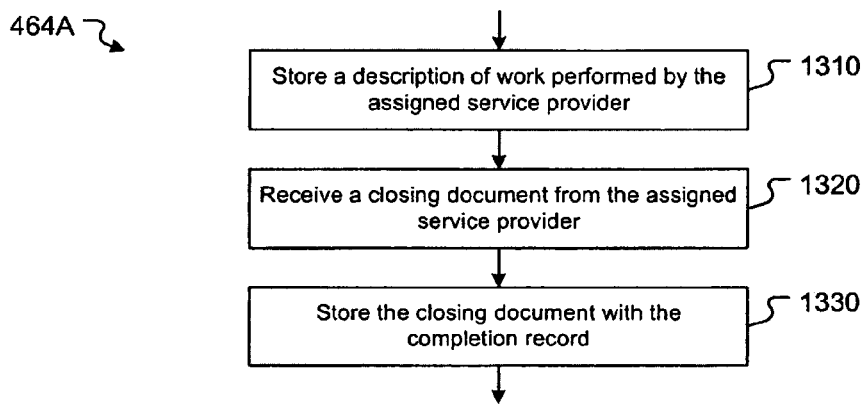
FIG. 13 illustrates a flowchart of a process of maintaining a completion record, in accordance with an embodiment of the present invention.

Once the service order has been scheduled, it naturally falls upon the service provider to carry out the services. Accordingly, the service provider may provide periodic progress updates to the system regarding the service order (block 462). The progress updates may be provided via a number of mediums, including but not limited to a web form, SMS text messaging, telephone, interactive voice response system, or the like. The system may then use the progress updates to maintain a completion record corresponding to the service order (block 464). FIG. 13 illustrates a flowchart 464A of a process of maintaining a completion record, in accordance with an embodiment of the present invention. At block 1310, a description of work performed by the assigned service provider is stored. In some cases, particularly in the cases of an enterprise buyer, the buyer may require the service provider to complete and/or provide one or more closing documents, such as a checklist, a work order signoff a list of additional items sold by the assigned service provider, a waiver of lien, a tax form, or the like. Thus, at block 1320, a closing document may be received from the service provider. The closing document may then be stored with the completion record (block 1330). The system then makes the completion record available to the buyer (block 468).

When, from the point of view of the service provider, the services have been completed, the service provider notifies the system that the service order has been completed (block 470). In response, the buyer is requested to confirm that the service order has been completed (lock 472). If the buyer responds that the service order has not been completed, the service order is put into a "problem" state, the service provider is notified (block 476), and flowchart 400 returns to block 462. At this point, the buyer and the service provider may work together to try to address any of the buyer's remaining concerns. If the buyer does confirm that the service order has been completed, the system annotates the completion of the service order (block 478).

Once the service order has been annotated as completed, various follow-up operations may be performed. For example, the system may then facilitate payment for the services from the buyer to the service provider (block 480). The system may also request feedback from the buyer regarding the services performed (block 482) and from the service provider regarding the service engagement with the buyer (block 483). Upon receipt of the feedback from the buyer and service provider (blocks 484 and 485), the system may then update the service provider's profile to reflect the buyer's feedback (block 486) and vise versa (block 487).

As discussed above, one particularly advantageous aspect of an embodiment of the present invention is the ability to manage profiles for both service provider companies and service provider technicians, rather than one or the other. This architecture allows for enhanced functionality, particularly from the point of view of a service provider company with multiple technicians. This architecture is also desirable from the point of view of a buyer, in that the distinction between a service provider company versus an individual technician can be made transparent to the buyer, as illustrated in the following discussion.

Figure 14A:
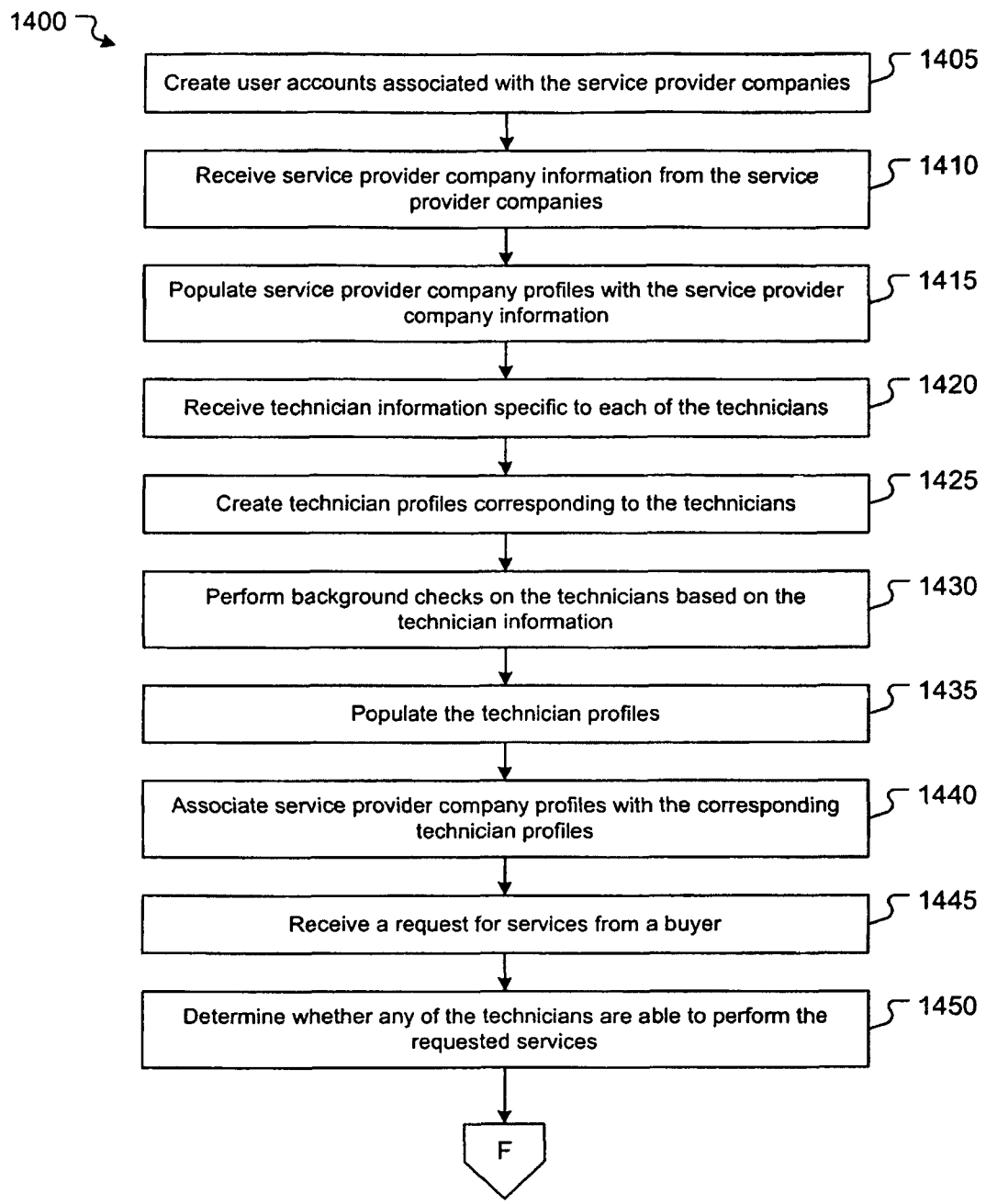
FIGS. 14A-B illustrate a flowchart of a process for managing a service provider database, in accordance with various embodiments of the present invention.
Figure 14B:
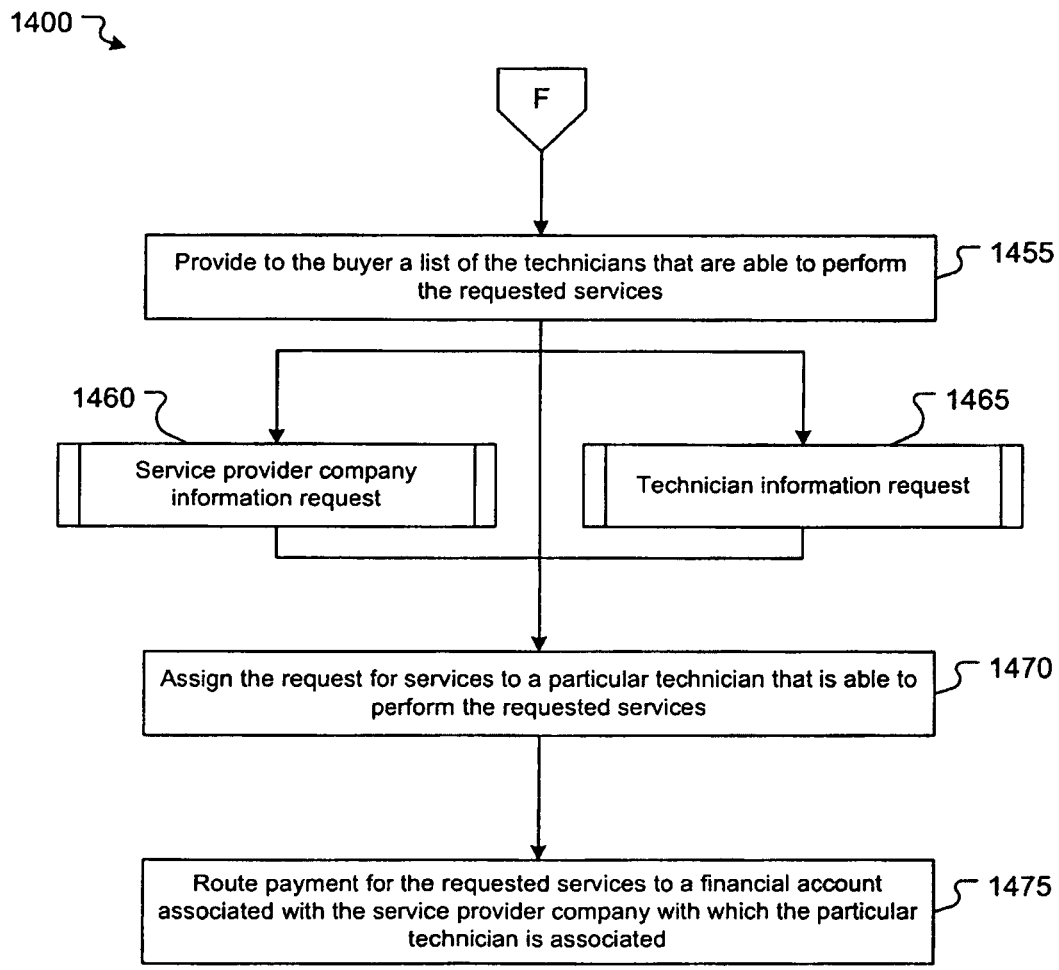

FIGS. 14A-B illustrate a flowchart 1400 of a process for managing a service provider database, in accordance with various embodiments of the present invention. At block 1405, user accounts associated with the service provider companies are created. This may be achieved in a manner similar to that of block 402 of FIG. 4, but is not limited as such. At block 1410, service provider company information is received from the service provider companies at block 1415, the service provider company profiles are populated with the service provider company information.

At block 1420, technician information specific to each of the technicians is received, and technician profiles corresponding to the technicians are subsequently created (block 1425). At block 1430, background checks of the technicians are conducted based on the technician information. The technician profiles are then populated (block 1435), for example, with the technician information and the results of the background checks. Once the service provider company profiles and the technician profiles have been created and populated, each service provider company profile is then linked or associated with the corresponding technician profiles (block 1440).

Figure 15:
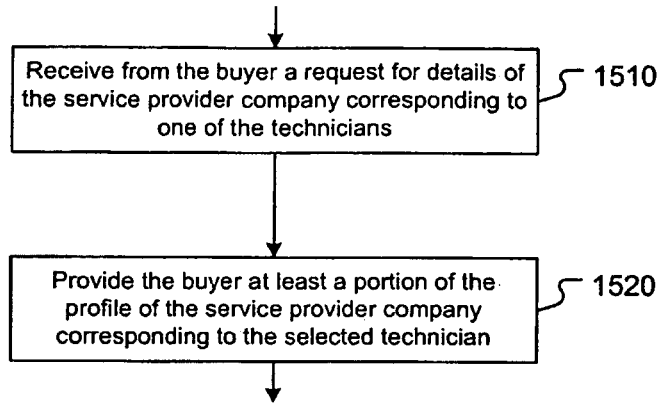
FIG. 15 illustrates a flowchart of a process for implementing a service provider company information request routine, in accordance with an embodiment of the present invention.
Figure 16:
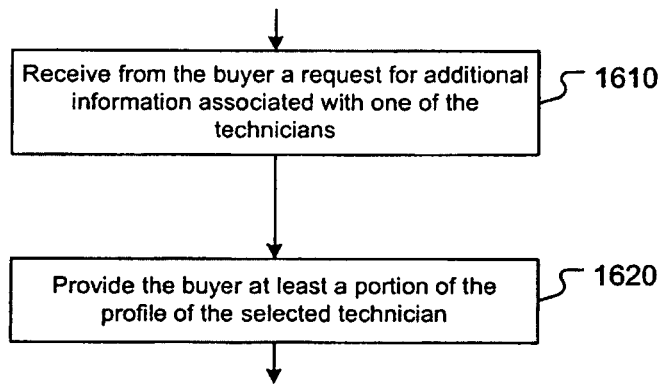
FIG. 16 illustrates a flowchart of a process for implementing a technician information request routine, in accordance with an embodiment of the present invention.

By using the above architecture, some operations may be performed at the company level and others may be performed at the technical, depending on where such operations are more appropriate. For example, after a request for services is received (block 1445), the system may determine whether any particular technicians are able to perform the requested services (block 1450). Searching at the technician level ensures that the buyer gets a technician that is qualified to perform the requested services and minimizes the likelihood of rescheduling. After performing the search, the buyer is provided with a list of the technicians that are able to perform the requested services (block 1445). Although the search results comprise a list of technicians, the results may also include an indication of which company each of the technicians is associated with, enabling the buyer not only to invoke a technician information request routine 1465, but also a service provider company information request routine 1460. Upon the invocation of the service provider company information request routine 1460, the system receives a request for details of the service provider company corresponding to a selected technician (block 1510) and in turn provides the buyer at least a portion of the profile of the service provider company corresponding to the selected technician (block 1520), as illustrated in flowchart 1460A of FIG. 15. Similarly, upon the invocation of the technician information request routine 1465, the system receives a request for details of a selected technician (block 1610) and in turn provides the buyer at least a portion of the profile of the selected technician (block 1620), as illustrated in flowchart 1465A of FIG. 16.

Thus, the buyer is provided with a certain degree of transparency when selecting a technician. In other words, the buyer knows the exact technician he or she will be getting, rather than leaving the choice of the technician to the company. Also, the buyer can review the credentials of the technician's company to obtain peace of mind that the technician is coming from a reputable company.

Ultimately, the request for services is assigned to a particular technician that is able to perform the requested services (block 1470). This may be achieved in a number of ways. For example, the request for services may be routed directly to the assigned technician. Alternatively, the request for services may be routed to the technician's company, which may in turn dispatch the request to the assigned technician. Once the services have been performed, the system may facilitate the routing of payment for the requested services to a financial account associated with the technician's company (block 1475).

Thus, the various embodiments described above provide for an electronic services marketplace that is robust enough to account for different types of buyers (e.g., consumer buyers, enterprise buyers, etc.) and different types of service providers (e.g., service provider companies, service provider technicians, sole proprietors, etc.). Buyers generally benefit from the peace of mind of knowing which particular technician will be performing the services and of knowing the reputation and other credentials of the technician's company (if applicable). Service providers benefit from the integrated ability to manage the entire life cycle of a service order from acceptance, to dispatch, to completion, to payment. Service providers and buyers alike may also use the above-described Select Provider Network mechanism to establish continuing, long-term business relationships.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of delegating a service order to a plurality of service providers registered on a service provider computer network, the method comprising:
   establishing a computer data repository of a first tier of the service providers;
   establishing a computer data repository of a second tier of the service providers;
   routing the service order to the first tier of service providers;
   routing the service order to the second tier of service providers if the service order is not accepted by one of the first tier service providers; and
   re-establishing the first and second tiers on a periodic basis, wherein re-establishing the first and second tiers comprises:
      determining costs associated with the service providers based on a cost function;
      re-allocating first tier service providers having costs greater than a first threshold to the second tier; and
      re-allocating second tier service providers having costs lower than a second threshold to the first tier.

2. The method as recited in claim 1, wherein the first tier of service providers is mutually exclusive from the second tier of service providers.

3. The method as recited in claim 1, wherein routing the service order to the second tier of service providers if the service order is not accepted by one of the first tier service providers comprises:
   routing the service order to the second tier of service providers if the service order is not accepted by one of the first tier service providers within a predetermined amount of time.

4. A method of delegating a service order to a plurality of service providers on a computer network comprising:
   registering on a service provider computer network, a first portion of service providers categorized into a first category of service providers and a second portion of service providers categorized into a second category of service;
   establishing a first tier of the first portion of service providers;
   establishing a second tier of the first portion of service providers;
   establishing a first tier of the second portion of service providers;
   establishing a second tier of the second portion of service providers;
   routing the service order to the first tier of the first portion of service providers when the service order corresponds to the first category of service providers;
   routing the service order to the second tier of the first portion of service providers if the service order is not accepted by one of the first tier of the first portion of service providers;
   routing the service order to the first tier of the second portion of service providers when the service order corresponds to the second category of service providers;
   routing the service order to the second tier of the second portion of service providers if the service order is not accepted by one of the first tier of the second portion of service providers; and
   re-establishing the first and second tiers on a periodic basis, wherein re-establishing the first and second tiers comprises:
      determining costs associated with the service providers based on a cost function;
      re-allocating first tier service providers having costs greater than a first threshold to the second tier; and
      re-allocating second tier service providers having costs lower than a second threshold to the first tier.

5. The method as recited in claim 4, wherein the first category corresponds to a first geographic area and the second category corresponds to a second geographic area.

6. The method as recited in claim 4, wherein the first category corresponds to a first service type and the second category corresponds to a second service type.

7. A method of delegating a service order to a plurality of service providers on a computer network comprising:
   registering the plurality of service providers on a service provider computer network;
   receiving service provider criteria from a buyer;
   determining a first tier of the service providers based on the service provider criteria;

determining a second tier of the service providers based on the service provider criteria;
receiving the service order from the buyer;
routing the service order to the first tier of service providers;
routing the service order to the second tier of service providers if the service order is not accepted by one of the first tier service providers; and
re-establishing the first and second tiers on a periodic basis, wherein re-establishing the first and second tiers comprises:
  determining costs associated with the service providers based on a cost function;
  re-allocating first tier service providers having costs greater than a first threshold to the second tier; and
  re-allocating second tier service provider's having costs lower than a second threshold to the first tier.

8. The method as recited in claim 7 further comprising:
providing a user interface for the buyer to view allocation of the service providers between the first tier and the second tier.

9. The method as recited in claim 7, wherein determining the first tier of the service providers based on the service provider criteria comprises:
  creating an invitation to join the first tier based upon the criteria;
  sending the invitation to those service providers that meet a minimum degree of the criteria;
  receiving one or more acceptances from one or more of the service providers that meet the minimum degree of the criteria; and
  allocating the accepting service providers to the first tier.

10. The method as recited in claim 9, wherein determining the second tier of the service providers based on the service provider criteria comprises:
  allocating the non-accepting service providers to the second tier.

11. The method as recited in claim 9 further comprising:
attaching a document to the invitation before sending the invitation.

12. The method as recited in claim 11, wherein the document comprises a contract, the method further comprising:
  receiving executed versions of the contract from the one or more of the service providers that meet the minimum degree of the criteria.

13. The method as recited in claim 9 further comprising:
  receiving a request from a particular service provider for consideration for the first tier;
  evaluating the particular service provider relative to the criteria; and
  sending the invitation to the particular service provider if the particular service provider meets the minimum degree of the criteria.

14. The method as recited in claim 9 further comprising:
screening the invitation before it is sent to ensure that the buyer is not spamming the service providers.

15. The method as recited in claim 9 further comprising:
providing a user interface to the buyer for the buyer to monitor acceptances received from the one or more of the service providers that meet the minimum degree of the criteria.

16. The method as recited in claim 7, wherein the buyer is a first buyer, the method further comprising:
  analyzing first profile characteristics of the first buyer;
  determining a second buyer that has second profile characteristics that match the first profile characteristics of the first buyer to a certain degree; and
  generating recommended service provider criteria for the first buyer to consider based on the second buyer's prior experience with certain service providers.

* * * * *